(12) United States Patent
Goruney et al.

(10) Patent No.: US 10,036,551 B2
(45) Date of Patent: Jul. 31, 2018

(54) LOW-FIRING RATE OXY-FUEL FLAT FLAME BURNER WITH OXYGEN STAGING

(71) Applicant: AIR PRODUCTS AND CHEMICALS, INC., Allentown, PA (US)

(72) Inventors: Tunc Goruney, Bethlehem, PA (US); Xiaoyi He, Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 641 days.

(21) Appl. No.: 14/636,287

(22) Filed: Mar. 3, 2015

(65) Prior Publication Data

US 2015/0267915 A1    Sep. 24, 2015

Related U.S. Application Data

(60) Provisional application No. 61/969,302, filed on Mar. 24, 2014.

(51) Int. Cl.
*F23D 14/22* (2006.01)
*F23D 14/64* (2006.01)
(Continued)

(52) U.S. Cl.
CPC ............. *F23D 14/22* (2013.01); *F23D 14/32* (2013.01); *F23D 14/48* (2013.01); *F23D 14/583* (2013.01);
(Continued)

(58) Field of Classification Search
CPC ......... F23D 14/22; F23D 14/583; F23D 14/48
(Continued)

(56) References Cited

U.S. PATENT DOCUMENTS

| | | | |
|---|---|---|---|
| 5,575,637 | A | 11/1996 | Slavejkov et al. |
| 5,611,682 | A | 3/1997 | Slavejkov et al. |

(Continued)

FOREIGN PATENT DOCUMENTS

| | | |
|---|---|---|
| CN | 2924318 | 7/2007 |
| CN | 203963935 U | 11/2014 |

(Continued)

*Primary Examiner* — Avinash Savani
*Assistant Examiner* — Rabeeul Zuberi
(74) *Attorney, Agent, or Firm* — Larry S. Zelson (57) ABSTRACT

A flat flame oxy-fuel burner including a gaseous fuel nozzle having a hydraulic diameter $D_{h\text{-}NG}$ and a width to height ratio w/a of at least 2; a primary oxidant conduit surrounding the fuel nozzle to form an annular primary oxidant nozzle between the fuel nozzle and the oxidant conduit, the oxidant conduit having a height b, the respective outlet ends of the fuel nozzle and the oxidant nozzle being aligned; and a precombustor extending from the outlet end of the fuel and oxidant nozzles and having a length L and a hydraulic diameter $D_h$; wherein the ratio $L/D_h$ is non-zero and less than or equal to 4; wherein the ratio $L/D_{h\text{-}NG}$ is non-zero and less than or equal to 12; and wherein the dimensions a, b, and w are sized to yield a primary oxidant Reynolds number from 200 to 22,000 during burner is operation at 0.05 to 1 MMBtu/hr.

13 Claims, 11 Drawing Sheets

(51) Int. Cl.
  *F23D 14/70*  (2006.01)
  *F23D 14/32*  (2006.01)
  *F23D 14/48*  (2006.01)
  *F23D 14/58*  (2006.01)

(52) U.S. Cl.
  CPC ............. *F23D 14/64* (2013.01); *F23D 14/70* (2013.01); *Y02E 20/344* (2013.01)

(58) Field of Classification Search
  USPC .......................................................... 431/8
  See application file for complete search history.

(56) References Cited

U.S. PATENT DOCUMENTS

| | | |
|---|---|---|
| 5,725,367 A | 3/1998 | Joshi et al. |
| 2006/0272332 A1* | 12/2006 | Moraes .................... F02C 7/22 60/776 |
| 2013/0071796 A1 | 3/2013 | Cole et al. |

FOREIGN PATENT DOCUMENTS

| | | |
|---|---|---|
| KR | 10-1355373 | 1/2014 |
| WO | 2010144858 | 12/2010 |

\* cited by examiner

LOW-FIRING RATE OXY-FUEL FLAT FLAME BURNER WITH OXYGEN STAGING

CROSS-REFERENCE TO RELATED APPLICATIONS

This application claims the priority of U.S. Provisional Application No. 61/969,302 filed on Mar. 24, 2014, which is incorporated by reference herein in its entirety.

BACKGROUND

This application relates to a staged flat flame oxy-fuel burner, and in particular, a staged flat flame oxy-fuel burner capable of achieving much lower firing rates than presently existing burners.

Staged flat flame oxy-fuel burners are known, including the burner described in U.S. Pat. No. 5,611,682, which is incorporated herein by reference in its entirety. Flat flame oxy-fuel burners without staging are also known, including the burner described in U.S. Pat. No. 5,575,637, which is incorporated herein by reference in its entirety. Both of these patents are owned by the assignee of the present application.

Extending the '682 and '637 patent designs to low firing rate applications is not a straightforward problem, and attempts to simply scale down the geometry of the burner have not been successful. In particular, one challenge has been preventing the burner block from overheating at low firing rates while producing a stable and luminous flame desired for glass melting. This balance has been especially elusive in burners designed using on standard scale-up/down rules to make a small scale flat flame oxy-fuel burner with oxygen staging based on the design principles of larger burners as described in the '682 and '637 patents.

The present application relates to a design approach and a resultant burner having a geometry and operating parameters that prevent burner block overheating throughout the entire operating range due to a systematic selection of the relative and absolute dimensions of the precombustor and fuel and oxygen nozzles.

SUMMARY

Various embodiments of a flat-flame oxy-fuel burner are described herein that are capable of achieving low firing rates.

In one embodiment, a flat flame oxy-fuel burner includes a gaseous fuel nozzle, a primary oxidant conduit, and a precombustor. The gaseous fuel nozzle has an outlet end, a width w, a height a, a hydraulic diameter $D_{h\text{-}NG}$, and a width to height ratio w/a of at least about 2. The primary oxidant conduit is positioned concentrically surrounding the fuel nozzle so as to form a substantially uniform annular primary oxidant nozzle between the fuel nozzle and the primary oxidant conduit, the primary oxidant conduit having a height b, the primary oxidant nozzle having an outlet end aligned with the outlet end of the fuel nozzle. The precombustor extends from the outlet end of the fuel and oxidant nozzles to a flame end, the precombustor having a length L, and a hydraulic diameter $D_h$; The ratio $L/D_h$ of the precombustor is greater than 0 and less than or equal to about 4. The precombustor length normalized by the hydraulic diameter of the fuel nozzle $L/D_{h\text{-}NG}$, is greater than 0 and less than or equal to about 12. The dimensions a, b, and w are sized such that the primary oxidant has a Reynolds number from about 200 to about 22,000 when the burner is operated at a firing rate of about 0.05 to about 1 MMBtu/hr.

In one variation, the ratio of w to a is from about 2 to about 60. In a further variation, the ratio of w to a is from about 5 to about 30.

In another variation, the width w of the fuel nozzle is from about 0.75 to about 3 inches. In a further variation, the width w of the fuel nozzle is from about 1 to about 2 inches.

In another variation, the length L of the precombustor is greater than 0 inches and less than about 4 inches. In a further variation, the length L of the precombustor is from about 0.5 to about 2 inches.

In another variation, the precombustor has a divergent geometry and the ratio of the hydraulic diameter at the flame end of the precombustor to the hydraulic diameter of the fuel nozzle is from about 6 to about 10. In a further variation, the precombustor has a divergent geometry and the ratio of the hydraulic diameter at the flame end of the precombustor to the hydraulic diameter of the fuel nozzle is from about 6 to about 8.

In another variation, the burner further includes a staging oxidant nozzle spaced apart from and generally parallel to the primary oxidant conduit.

In yet another variation, the burner further includes boundary layer disruptors positioned along at least a portion of a wall of at least one of the fuel nozzle and the primary oxidant nozzle, the boundary layer disruptors being configured so as to increase the turbulence of oxidant flowing in the primary oxidant passage. In a further variation, the boundary layer disruptors are selected from the group consisting of: dimples, indentations, bumps, scribes, grooves, channels, mesh, and combinations thereof. In one variation, the boundary layer disruptors are positioned along at least a portion of the inner wall of the primary oxidant nozzle and are configured so as to increase the turbulence of oxidant flowing in the primary oxidant passage. In another variation, alone or in combination with other variations, the boundary layer disruptors are positioned along at least a portion of the outer wall of the fuel nozzle and are configured so as to increase the turbulence of oxidant flowing in the primary oxidant passage. In yet another variation, alone or in combination with other variations, the boundary layer disruptors are positioned along at least a portion of the inner wall of the fuel nozzle and are configured so as to increase the turbulence of fuel flowing in the fuel passage.

DETAILED DESCRIPTION

Figure 1:
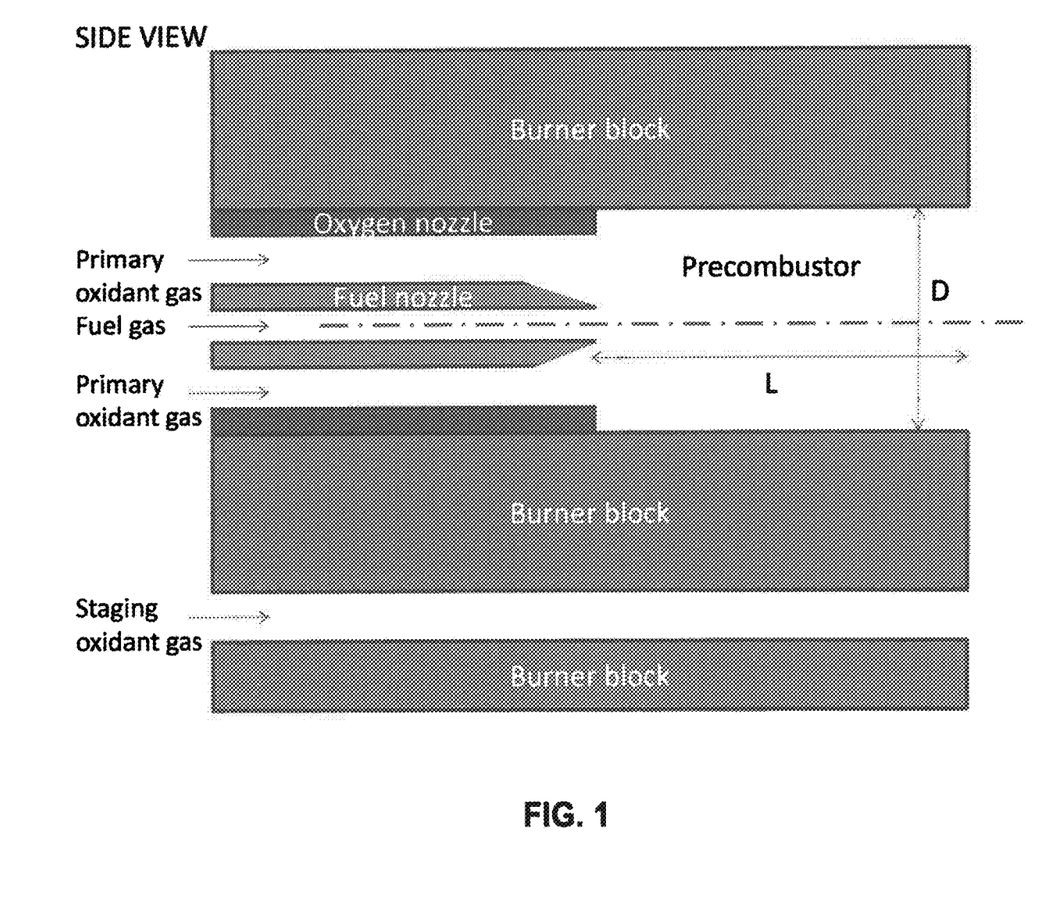
FIG. 1 is a side cross-sectional view of an embodiment of a burner and burner block showing some of the relevant dimensions.
Figure 2:
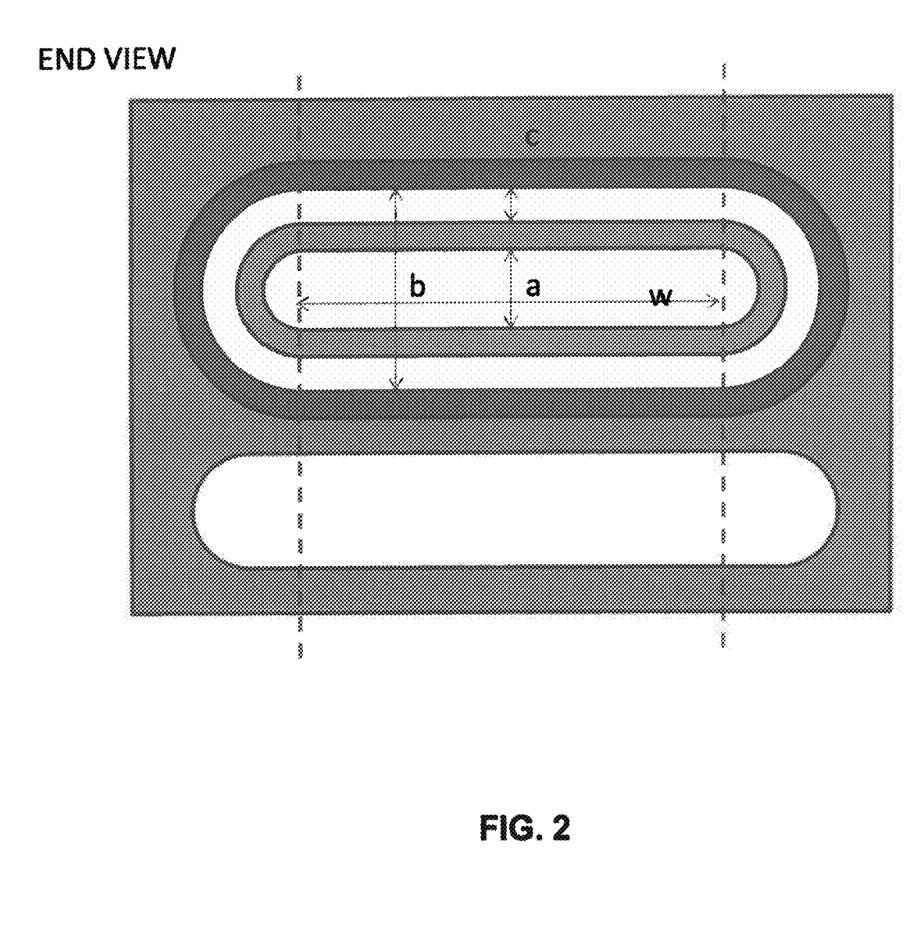
FIG. 2 is an end view of the embodiment of a burner and burner block of FIG. 1 showing additional relevant dimensions.

FIGS. 1 and 2 show an exemplary embodiment of a staged flat flame oxy-fuel burner with relevant dimensions. The dimensions, which will be discussed in detail herein, are as follows:

L Precombustor length
D Precombustor height
a Fuel gas passage height
b Primary oxidant gas nozzle inner height
c Primary oxidant gas passage height
w Fuel gas and oxidant gas nozzle width (equal for both to keep b constant)
$D_h$ Hydraulic diameter (4 times cross-sectional area divided by perimeter). For a circle: $4\pi r2/2\pi r=2r$; For the fuel nozzle: $D_{h\text{-}NG}$ In the embodiments of the '682 and '637 patents, the precombustor length L is from 1 to 24 inches and preferably from 4 to 8 inches; the fuel nozzle and staging nozzle have a width of 4 to 40 inches and preferably of 8 to 24 inches; and the firing rate is from 0.5 to 40 MMBtu/hr and preferably from 1 to 20 MMBtu/hr. In addition, the ratio of the hydraulic diameter of the flame end of the precombustor to the hydraulic diameter of the fuel nozzle is from 1 to 6.

In a burner as depicted in FIGS. 1 and 2, an annular primary oxidant gas flow is provided in the annular opening having dimension c surrounding a central fuel gas flow in the opening having a dimension a. The primary oxidant gas acts as a cooling medium between the combusting interface of the fuel and oxidant, removing the heat generated by the oxy-fuel flame inside the precombustor and thereby preventing burner block overheating.

However, for a given burner nozzle geometry, at low firing rates and highly staged conditions (i.e., when a large proportion of the oxidant is flowing through the secondary staging oxidant nozzle instead of the primary oxidant nozzle), the primary oxidant gas flow rate can become so low that the flow undergoes a turbulent-to-laminar transition and becomes laminar. Convective cooling rate associated with laminar flow is significantly lower than that of turbulent. As a result, the cooling provided by the primary oxidant gas flow may be unable to sufficiently remove the heat generated by the oxy-fuel flame inside the precombustor, thereby allowing the burner block to overheat and fail.

In the primary oxidant passage/flow, the Reynolds Number is calculated as:

$$Re_{prim\text{-}O2}=\rho\cdot Q/\{\mu\cdot[w+\pi/4\cdot(a+b)]\}, \quad \text{Equation 1:}$$

where Q is the volumetric flow rate, $\rho$ is the density, $\mu$ is the dynamic viscosity of primary oxidant, and $\rho$ and $\mu$ specified at a particular temperature.

For a given percentage of the total oxidant flow introduced to the staging port, the flow rate of oxidant gas passing through the primary oxidant gas passage around the fuel gas is proportional to the firing rate. At a given firing rate, the distribution of flow passing through the primary oxidant gas passage and staging oxidant gas passage can be controlled via an upstream diverter valve.

Figure 3:
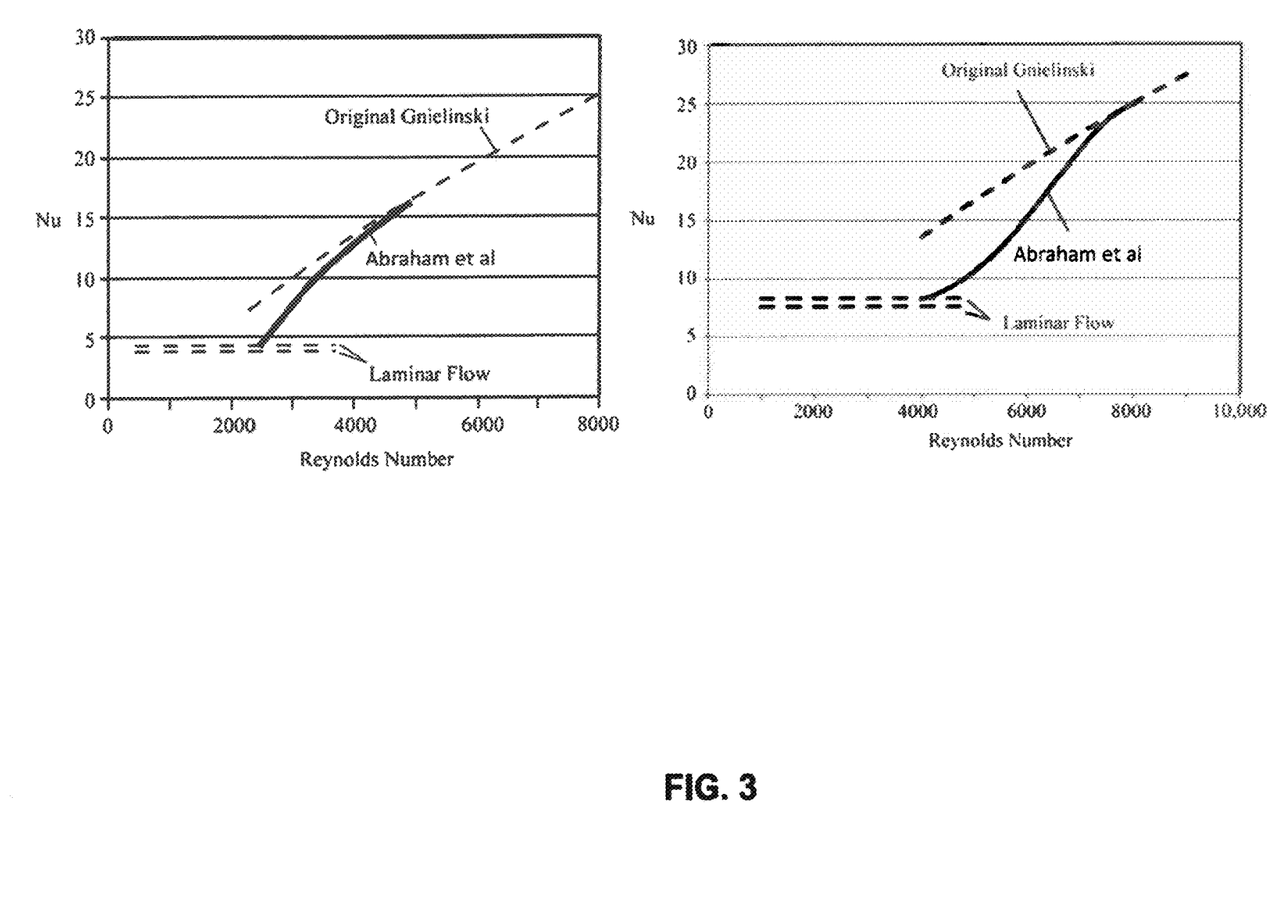
FIG. 3 is a pair of graphs showing Nusselt number as a function of Reynolds number at a Prandtl number of 0.7. Left: Constant-area round pipe. Right: Parallel-plate channel. Adapted from Abraham et al, Internal-flow Nusselt numbers for the low-Reynolds-number end of the laminar-to-turbulent transition regime, *International Journal of Heat and Mass Transfer*, 54(1-3):5 (2011).

As long as the convective cooling rate provided by the primary oxidant gas flow is equal to or higher than the heat generated by the flame inside the precombustor, the flame can pass through the precombustor without damaging the burner block walls. Convective cooling rate is proportional to Nusselt number (Nu), which is a strong function of Reynolds number as illustrated in FIG. 3. Note the annular shaped primary oxidant gas passage can be characterized by these two extreme geometries which bound the present design, i.e., round pipe and parallel-plate channel. As can be seen from FIG. 3, below a critical Reynolds number where the flow is defined as laminar, the Nusselt number and therefore convective cooling rate significantly drops and remains constant.

Figure 4:
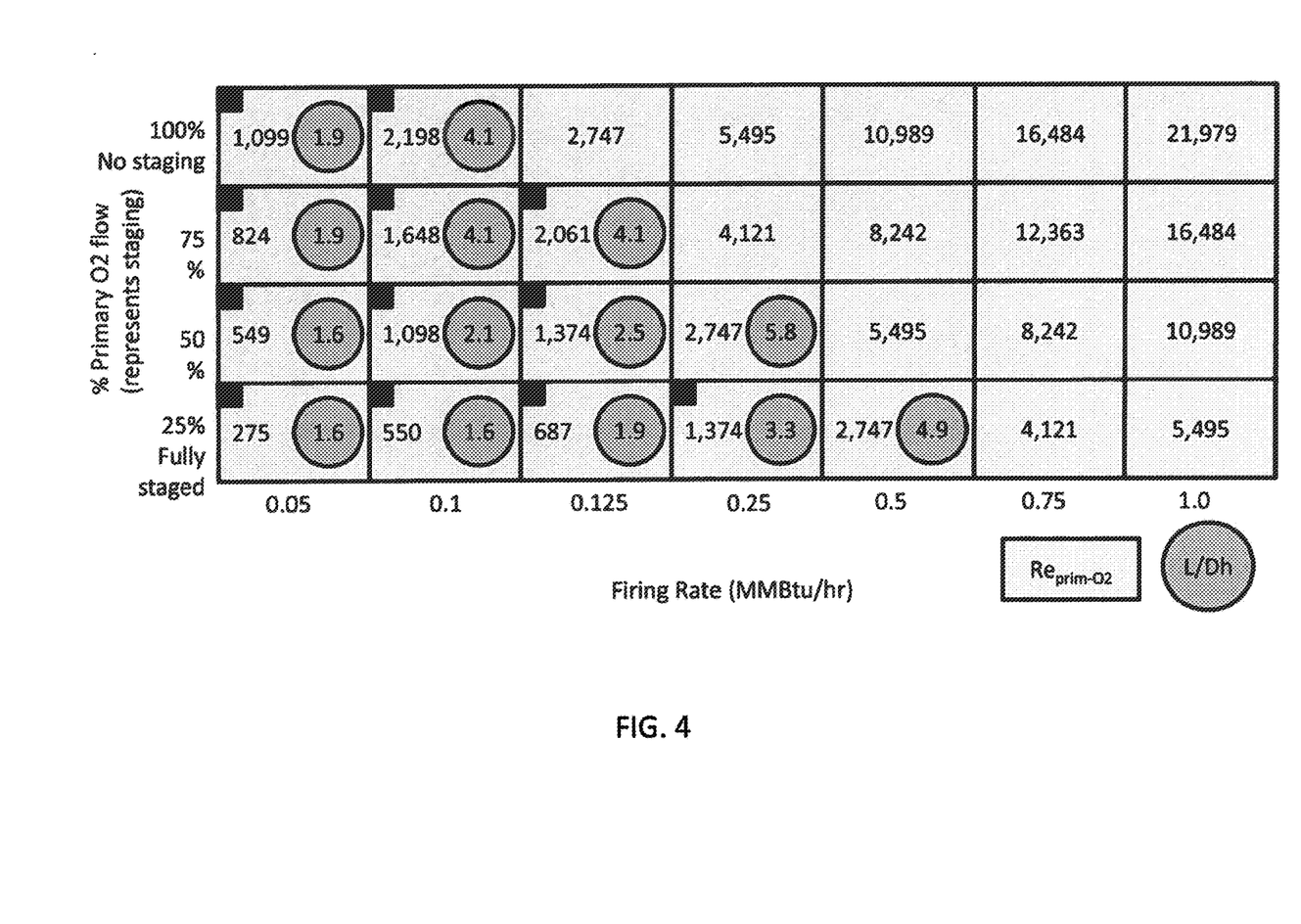
FIG. 4 is a graphical table showing burner block overheating as a function of precombustor L/Dh, % primary oxygen flow, and primary oxygen flow Reynolds number. Values in rectangles show primary oxygen flow Reynolds number at room temperature and ambient pressure, where values shown in rectangles marked with a square located on the top left corner represent values lower than critical Reynolds number for round pipe flow of 2,300. Values in circles show lowest L/Dh at which burner block overheating is observed (no circle means no overheating).

FIG. 4 shows the results of tests that were conducted using natural gas as the fuel gas and pure oxygen as the oxidant gas for firing rate from 0.05 to 1.0 MMBtu/hr. Primary oxygen flow ranged from 25% to 100%, representative of full staging and no staging, respectively. Precombustor $L/D_h$ ($D_h$ defined at the flame end of precombustor) was from 1.6 to 5.8 to evaluate the effect of the aforementioned parameters on burner block overheating.

As shown in FIG. 4, burner block overheating is more likely to occur as precombustor $L/D_h$ increases, firing rate decreases, primary oxygen flow Reynolds number decreases, and staging (proportion of secondary oxidant to primary oxidant) increases. Importantly, burner block overheating consistently occurs at Reynolds numbers below the critical Reynolds number calculated at room temperature and ambient pressure, as represented by numbers in rectangles marked with a square located in the top left corner.

Results suggest that primary oxidant passage should be designed to increase Reynolds number as much as possible to minimize/prevent burner block overheating. As can be seen from Equation 1, for a given $\rho$ and $\mu$ (characteristics of the oxidant) and Q (oxidant flow rate, which corresponds to firing rate and staging percentage), the Reynolds number will increase as the dimensions w, a, and b are decreased.

However, decreasing dimension a imposes certain manufacturing challenges. Further, decreasing dimension b involves some tradeoffs, since a smaller b would increase primary oxygen velocity and which would both increase convective cooling but would also likely enhance mixing between natural gas and oxygen flows, potentially releasing heat at a higher rate inside the precombustor. Still further, decreasing dimension w requires to making the passage width w smaller for both the primary oxygen and natural gas nozzles to maintain a constant dimension c along the periphery and thus a relatively uniform oxygen velocity profile. Lastly, the effect of w on Re is higher than that of a or b, since $\pi/4<1$.

Computational fluid dynamics (CFD) simulations were carried out on various geometric configurations using commercially available ANSYS Fluent software, which simulates the fluid flow, heat transfer, and combustion by solving governing equations for mass, momentum, and energy conservation. A summary of the CFD simulation results is shown in FIG. 5. In FIG. 5, the firing direction is from right to left.

Figure 5A:
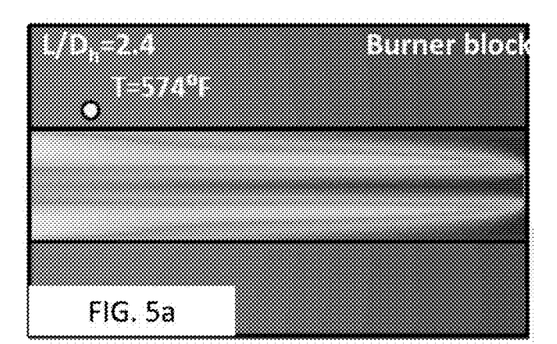
FIGS. 5a-5d are graphical depictions of computational fluid dynamic (CFD) results for various geometric configurations and operating conditions.

In the model, a representative temperature at a given depth inside the precombustor is compared. FIG. 5a shows the base case.

Figure 5B:
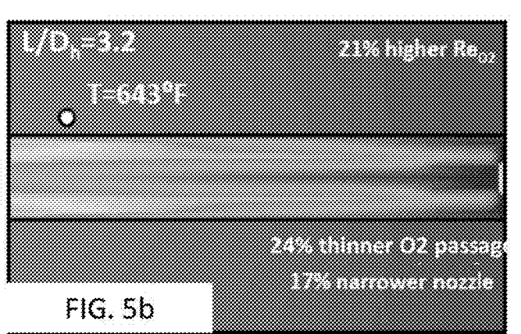

FIG. 5b shows a case in which, compared with FIG. 5a, the L/Dh of the precombustor has been increased by 30%, dimension b has been decreased by 24%, and dimension a has been decreased by 17%. The result of these modifications is that the precombustor wall temperature at the specified point rose by 69° F., meaning that the 30% increased precombustor length outweighs the increased benefit of a 21% higher Reynolds number in the oxidant passage.

Figure 5C:
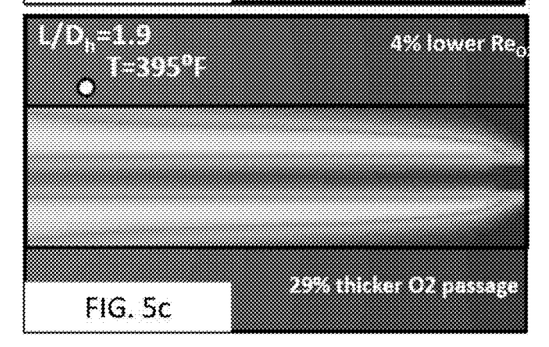

FIG. 5c shows a case in which, compared with FIG. 5a, the L/Dh of the precombustor has been decreased by 20% and the dimension b has been increased by 29% to achieve a 4% decrease in the oxygen Reynolds number. The result of these modifications is that the precombustor wall temperature at the specified point dropped by 179° F., meaning that benefit of a 20% decreased precombustor length outweighs the cooling losses due to a 4% lower Reynolds number.

Figure 5D:
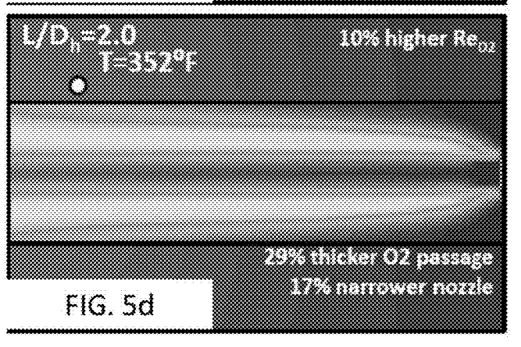

FIG. 5d shows a case in which, compared with FIG. 5c, the L/Dh of the precombustor has been increased by 5% (17% decrease as compared with FIG. 5a), dimension b has been increased by 29% (same as in FIG. 5c), and dimension a has been decreased by 17% (same as in FIG. 5b) to yield a 10% higher Reynolds number in the oxidant passage. The result of these modifications is that the precombustor wall temperature at the specified point dropped another 43° F. from the temperature of FIG. 5c, which shows that the 10% higher Reynolds number outweighs the 5% decrease in precombustor length.

The results of the four CFD simulations shown in FIGS. 5a through 5d are summarized below in Table 1.

TABLE 1

| Case | 5a | 5b | 5c | 5d |
|---|---|---|---|---|
| T (° F.) | 574 | 643 | 395 | 352 |
| L/$D_h$ | 2.4 | 3.2 | 1.9 | 2.0 |
| Re | base | +21% | −4% | +10% |
| b | base | −24% | +29% | +29% |
| w | base | −17% | ±0% | −17% |

In sum, these results unexpectedly suggest that effect of primary oxygen flow Reynolds number on burner block overheating is secondary compared with primary oxidant passage height, which dictates precombustor height and primary oxygen velocity. A thinner primary oxidant passage translates into: (1) a shorter distance between the heat source, i.e., flame and precombustor walls, resulting in higher temperature at a given depth inside the precombustor; and (2) a higher primary oxygen velocity, resulting in more enhanced mixing between oxygen and natural gas flows, thereby earlier onset of heat release inside the precombustor, again resulting in higher temperature at a given depth inside the precombustor.

The results also indicate that the burner block temperature can be effectively reduced by increasing the primary oxygen Re and decreasing precombustor L/Dh, in combination.

For a burner designed to operated at a firing rate of about 0.05 to about 1 MMBtu/hr, a preferred precombustor geometry has an L/Dh from greater than 0 to about 2, and operates at a Reynolds number from about 200 to about 22,000. In one embodiment in which the desired Reynolds number has been achieved at these firing rates, the width w of the fuel nozzle is about from about 0.75 to about 3 inches, and preferably from about 1 to about 2 inches. In the embodiment, the width to height ratio of the fuel nozzle is from about 2 to about 60 and preferably from about 5 to about 30, the length L of the precombustor is less than about 4 inches and preferably from about 0.5 to about 2 inches. In the embodiment, the ratio of $D_h$ at the flame end of the precombustor to $D_h$ of the fuel and oxidant nozzles is from about 6 to about 10 and preferably from about 6 to about 8.

Figure 6:
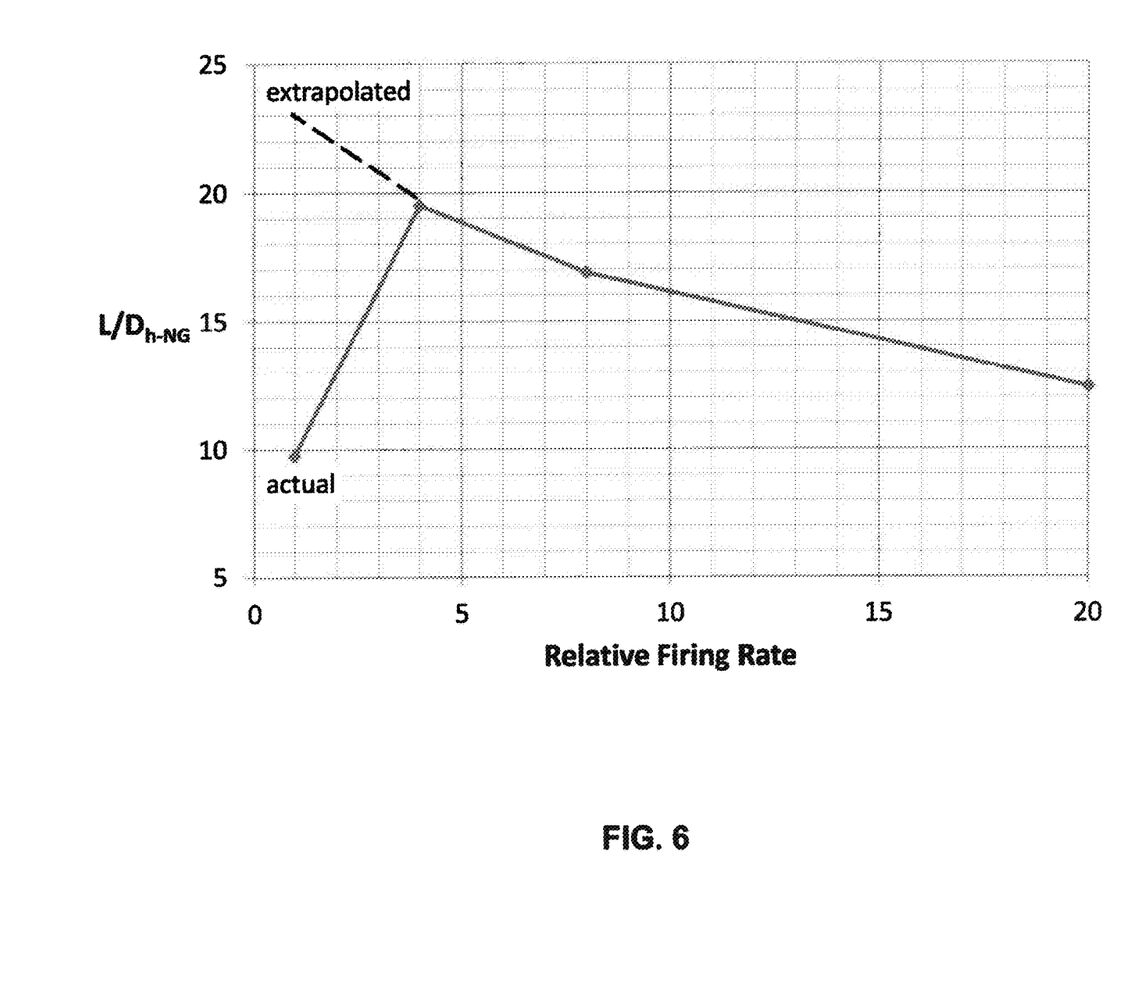
FIG. 6 is a graph of precombustor length normalized by the hydraulic diameter of the fuel nozzle as a function of the relative firing rate of larger burners as described in the '682 and '637 patents, and the lower firing rate burner described herein.

As discussed above, extending existing high firing rate burner designs, as in the '682 and '637 patents, to low firing rate applications is not a straightforward problem. FIG. 6 shows precombustor length normalized by the hydraulic diameter of the fuel nozzle, $D_{h\text{-}NG}$, as a function of the relative firing rate of larger burners as described in the '682 and '637 patents and the burner designed using the design principals disclosed in the present application. The presently disclosed burner is indicated by the diamond data point marked "actual" very left of the graph at $L/D_{h\text{-}NG}$ of about 10. The dashed line represents the extrapolated $L/D_{h\text{-}NG}$ for burners designed using standard scale-up/down rules to make a small scale flat flame oxy-fuel burner with oxygen staging based on the design principles of larger burners as described in the '682 and '637 patents. The actual $L/D_{h\text{-}NG}$ is approximately 60% less than that of the expected based on standard design rules. In general, in the present burner, the precombustor length normalized by the hydraulic diameter of the fuel nozzle ($L/D_{h\text{-}NG}$) is from about 12 to about 20.

Figure 7:
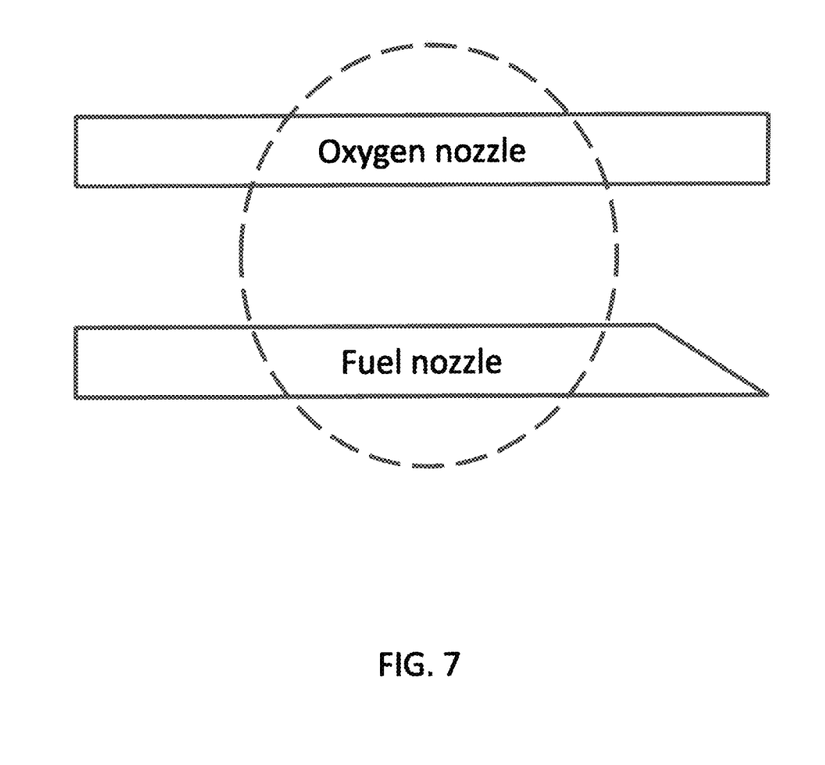
FIG. 7 is a cross-sectional view of one half of the oxygen and fuel nozzles, showing the oxidant passage between those nozzles, for use in illustrating various boundary layer disruptors as shown in FIGS. 8-10.

It has been shown that increasing primary oxygen flow Reynolds number can help reduce the risk of overheating the burner block, and this was accomplished by changing the variables in Equation 1. There are other ways of increasing the Reynolds number of the primary oxygen flow that may optionally be employed in addition to the previously described embodiments. In particular, the boundary layer of the oxygen flow (bounded by the flow passage shown in FIG. 7) can be energized by strategically applying various boundary layer disruptors.

Figure 8A:
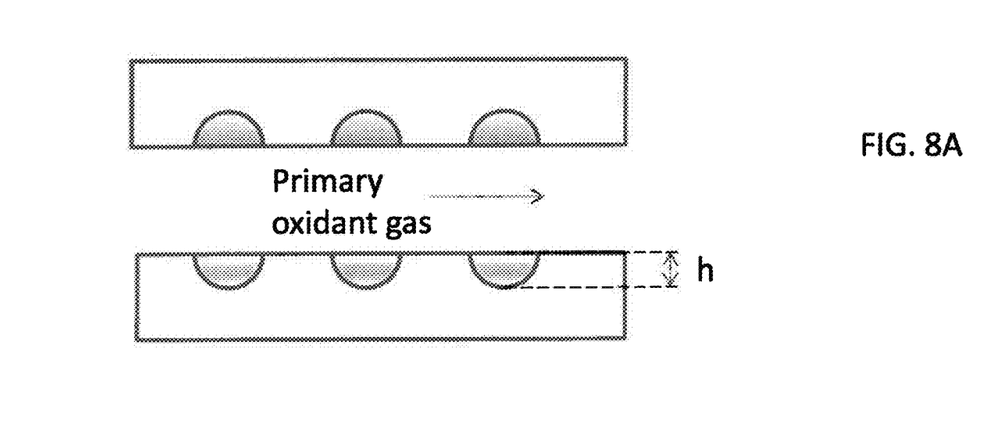
FIGS. 8A and 8B are cross-sectional and plan views, respectively, of the nozzles as in FIG. 7, showing boundary layer disruptors in the form of dimples or bumps.
Figure 8B:
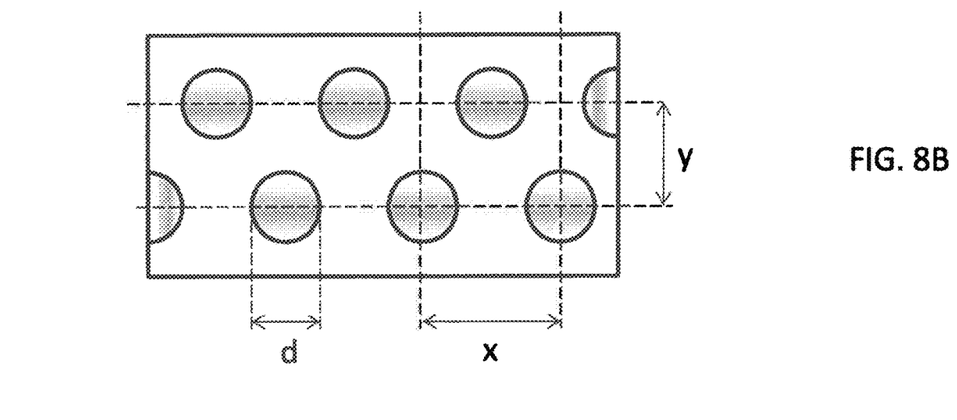
Figure 9A:
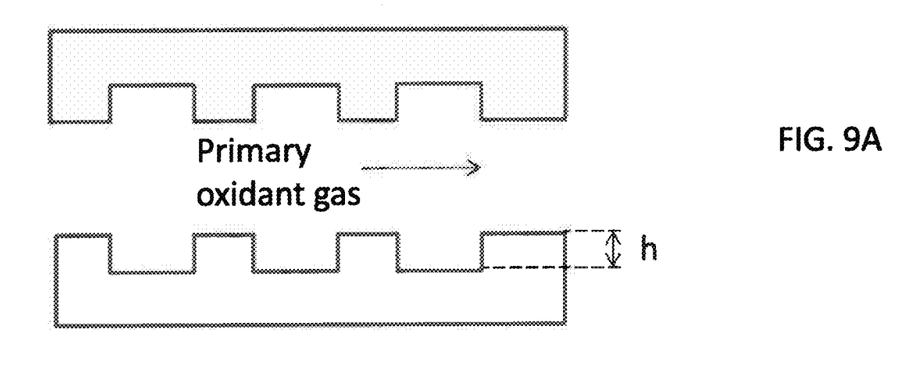
FIGS. 9A and 9B are cross-sectional and plan views, respectively, of the nozzles as in FIG. 7, showing boundary layer disruptors in the form of rectangular grooves transverse to the flow direction.
Figure 9B:
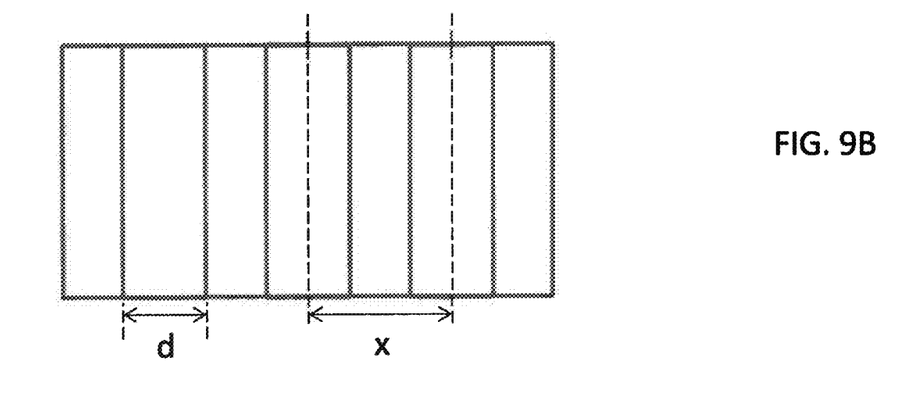
Figure 10A:
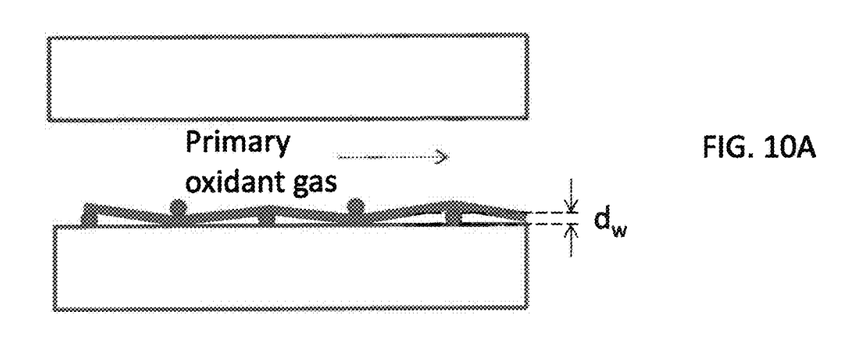
FIGS. 10A and 10B are cross sectional and plan views, respectively, of the nozzles as in FIG. 7, showing boundary layer disruptors in the form of a mesh.
Figure 10B:
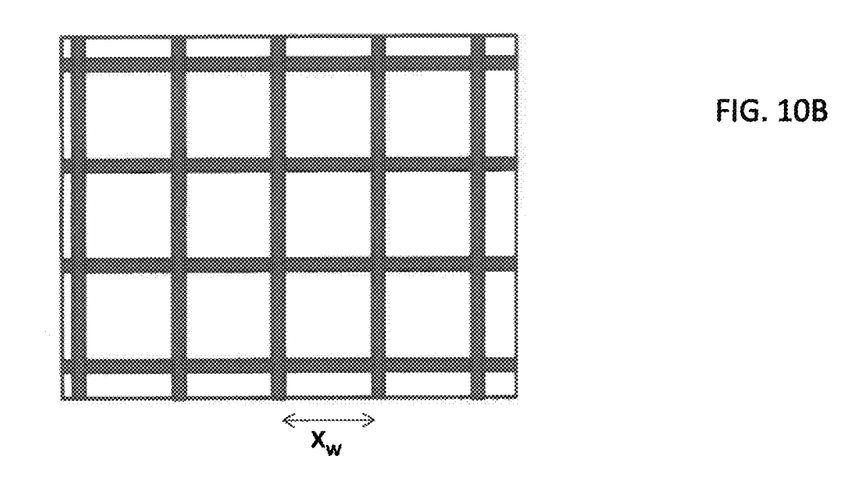

In one example of boundary layer disruptors, as shown in FIGS. 8A and 8B, a set of concave and/or convex geometries (indentations and/or bumps) can be formed on the inner surface of the oxygen nozzle and/or the outer surface of the fuel nozzle that are sufficiently small not to disturb the central core of the oxygen flow, since disturbing the central flow could induce enhanced mixing between fuel and oxidant streams and overheat the precombustor or burner block. Similar geometries can be applied to the outer surface of the oxygen nozzle and/or the inner surface of the fuel nozzle to minimize the velocity slip between fuel and oxygen streams. In particular, the introduction of indentations/bumps on the inner surface of the oxygen nozzle enables earlier transition into a turbulent boundary layer between precombustor internal walls and the oxidant stream and enhances convective cooling of the precombustor internal walls without enhancing mixing of fuel and oxidant streams. The shape of the indentations or bumps is not limited to what is shown in FIGS. 8A and 8B. For example, the indentations or bumps may be staggered or non-staggered, or may have constant or variable cross-section across the width of the fuel nozzle. In the embodiment of FIGS. 9A and 9B, indented scribes or slots across the entire width of the nozzle are employed. In the embodiment of FIGS. 10A and 10B, a woven or extruded mesh is applied across the nozzle surfaces.

Alternatively, or in addition, to boundary layer disruptors in the oxygen flow passage, similar boundary layer disruptors may be provided on the inner surface of the fuel nozzle to increase the turbulence of fuel flowing in the flow passage. This may be particularly beneficial when boundary layer disruptors are present on the outer surface of the fuel nozzle in the oxidant passage, to aid in matching up the boundary layer velocity profiles of the fuel and oxygen, thereby minimizing slip and delaying mixing.

Figure 11:
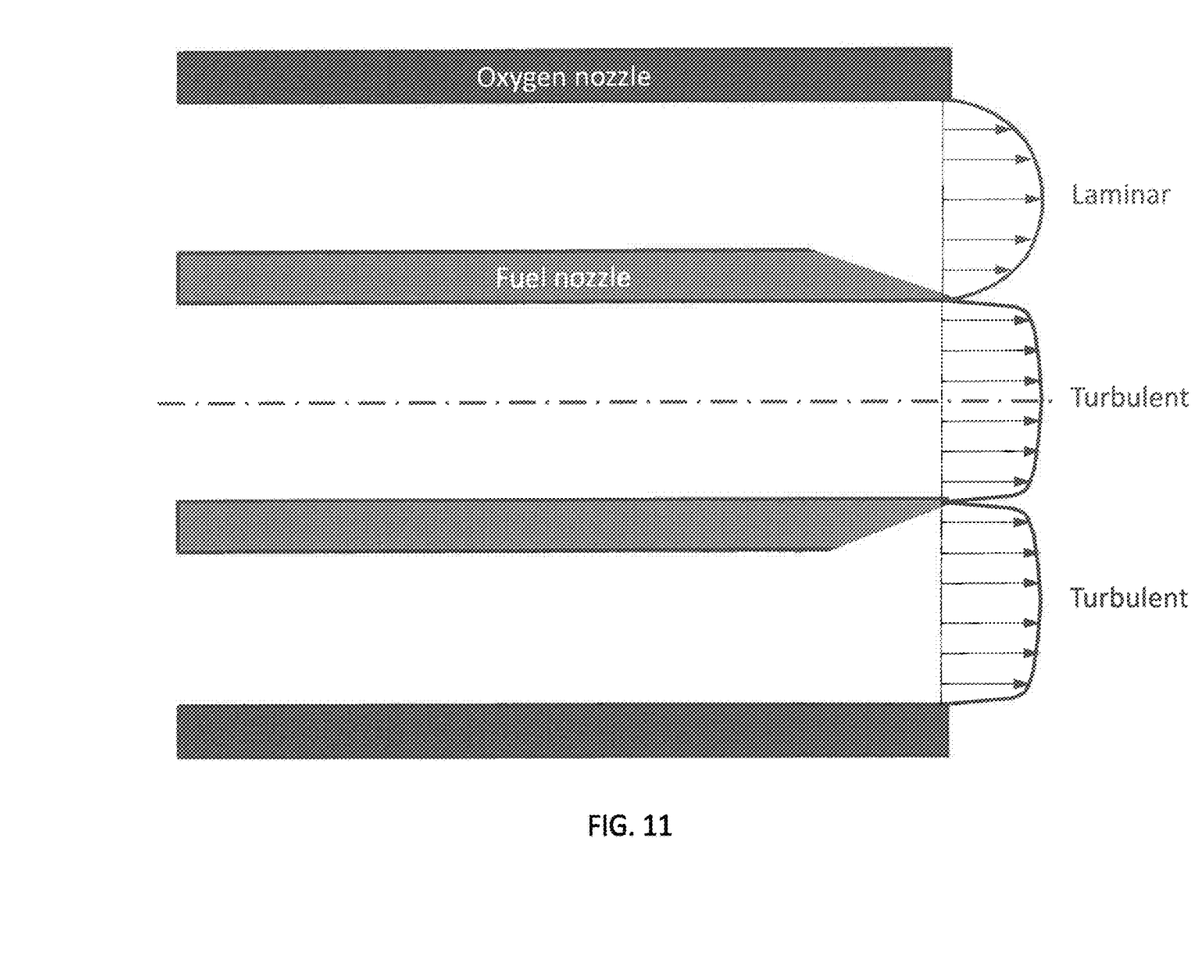
FIG. 11 is a cross-sectional view of the oxygen and fuel nozzles shown in part in FIG. 7, illustrating a comparison between laminar flow in the oxidant passage (no flow disruptors) and turbulent flow in the oxidant passage (flow disruptors present).

As illustrated in FIG. 11, assuming a turbulent velocity profile in fuel passage, a turbulent boundary layer in oxidant passage will generate a smaller velocity differential/slip at the fuel-oxygen interface compared to that of a laminar boundary layer, delaying the onset of mixing of fuel and oxygen streams, and thereby reducing the risk of burner block overheating. In the meantime, a turbulent boundary layer would translate into higher local Reynolds number near the boundary, which would increase convective heat transfer coefficient and eventually help reduce the risk of overheating in the burner block.

The steady-state laminar flow inside the annular primary oxidant passage can be characterized by Poiseuille flow between parallel plates. The corresponding velocity profile u(z) across the height of the passage is expressed as:

$$u(z) = \frac{1}{2\mu}\frac{\partial p}{\partial x}\left(z^2 - \frac{c^2}{4}\right)$$ Equation 2 where μ represents dynamic viscosity of the fluid, dp/dx is streamwise pressure gradient, z is the coordinate across the passage height where $z_{min}=-c/2$ and $z_{max}=+c/2$. Substituting representative values for dp/dx, μ and c, and using the boundary layer thickness defined by the requirement that the fluid velocity parallel to the surface is equal to 99% of the free stream velocity, at any given firing rate, one can calculate the boundary layer thickness along the entire length of the primary oxidant passage. This is particularly useful in determining the maximum height of the indentations/bumps used to energize the boundary layer. The criteria used is that the maximum characteristic height of the indentations/bumps should be less than or equal to the maximum boundary layer thickness. For this particular burner, the maximum height h, or two times the diameter $d_w$, is calculated to be less than 21%, preferably less than 10%, more preferably between 0.1% and 5% of the annular oxidant passage height c.

For the embodiments FIGS. 8 and 9, the streamwise (x) and transverse (y) distances between two consecutive indentations or bumps can be 1d≤x, y≤100d, preferably 1d≤x, y≤40d, more preferably 2d≤x, y≤10d.

For the embodiment FIG. 10, the streamwise ($x_w$) and transverse ($y_w$) distances between two consecutive bumps can be $1d_w≤x_w$, $y_w≤200d_w$, preferably $1d_w≤x_w$, $y_w≤100d_w$, more preferably $2d_w≤x_w$, $y_w≤20d_w$.

In one example of a burner with precombustor using boundary layer disruptors or disruptors, a burner with precombustor was operated at 0.125 MMBtu/hr firing rate with about 25% of oxidant flow passing through primary oxidant nozzle, with the burner having boundary layer disruptors in the form of indented scribes on the fuel nozzle outer surface (as in the embodiment of FIG. 9, but only on the fuel nozzle side of the oxidant passage). A delay in overheating of about 3 minutes was achieved as compared to a precombustor paired with a burner operating without the boundary layer disruptors. Each scribe measured about d=0.004" wide and h=0.001" to 0.0015" deep along the top and bottom surface of the fuel nozzle for about ⅔$^{rd}$ of its length. Two consecutive scribes were about 0.060" inches apart from each other. Note that under more favorable operating conditions, it is expected that boundary layer disruptors may be able to completely eliminate overheating.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A flat flame oxy-fuel burner comprising:
   a gaseous fuel nozzle having an outlet end, a width w, a height a, a hydraulic diameter $D_{h-NG}$, and a width to height ratio w/a of at least about 2;
   a primary oxidant conduit positioned concentrically surrounding the fuel nozzle so as to form a substantially uniform annular primary oxidant nozzle between the fuel nozzle and the primary oxidant conduit, the primary oxidant conduit having a height b, the primary oxidant nozzle having an outlet end aligned with the outlet end of the fuel nozzle; and
   a precombustor extending from the outlet end of the fuel and oxidant nozzles to a flame end, the precombustor having a length L, and a hydraulic diameter $D_h$;
   wherein the ratio $L/D_h$ of the precombustor is greater than 0 and less than or equal to about 4;
   wherein the precombustor length normalized by the hydraulic diameter of the fuel nozzle $L/D_{h-NG}$ is greater than 0 and less than or equal to about 12; and
   wherein the dimensions a, b, and w, are sized such that the primary oxidant has a Reynolds number from about 200 to about 22,000 when the burner is operated at a firing rate of about 0.05 to about 1 MMBtu/hr; and
   wherein the width w of the fuel nozzle is from about 1 to about 2 inches.

2. The oxy-fuel burner of claim 1, wherein the ratio of w to a is from about 2 to about 60.

3. The oxy-fuel burner of claim 2, wherein the ratio of w to a is from about 5 to about 30.

4. The oxy-fuel burner of claim 1, wherein the length L of the precombustor is greater than 0 inches and less than about 4 inches.

5. The oxy-fuel burner of claim 4, wherein the length L of the precombustor is from about 0.5 to about 2 inches.

6. The oxy-fuel burner of claim 1, wherein the precombustor has a divergent geometry and the ratio of the hydraulic diameter at the flame end of the precombustor to the hydraulic diameter of the fuel nozzle is from about 6 to about 10.

7. The oxy-fuel burner of claim 6, wherein the precombustor has a divergent geometry and the ratio of the hydraulic diameter at the flame end of the precombustor to the hydraulic diameter of the fuel nozzle is from about 6 to about 8.

8. The oxy-fuel burner of claim 1, further comprising a staging oxidant nozzle spaced apart from and generally parallel to the primary oxidant conduit.

9. The oxy-fuel burner of claim 1, further comprising boundary layer disruptors positioned along at least a portion of a wall of at least one of the fuel nozzle and the primary oxidant nozzle.

10. The oxy-fuel burner of claim 9, wherein the boundary layer disruptors are selected from the group consisting of: dimples, indentations, bumps, scribes, grooves, channels, mesh, and combinations thereof.

11. The oxy-fuel burner of claim 9, wherein the boundary layer disruptors are positioned along at least a portion of the inner wall of the primary oxidant nozzle and are configured so as to increase the turbulence of oxidant flowing in the primary oxidant passage.

12. The oxy-fuel burner of claim 9, wherein the boundary layer disruptors are positioned along at least a portion of the outer wall of the fuel nozzle and are configured so as to increase the turbulence of oxidant flowing in the primary oxidant passage.

13. The oxy-fuel burner of claim 9, wherein the boundary layer disruptors are positioned along at least a portion of the inner wall of the fuel nozzle and are configured so as to increase the turbulence of fuel flowing in the fuel passage.

* * * * *